(12) United States Patent
Scolari et al.

(10) Patent No.: US 8,857,839 B2
(45) Date of Patent: Oct. 14, 2014

(54) LEVER DRIVE SYSTEM FOR A SCOOTER (71) Applicant: Zike, LLC, Greenville, SC (US)

(72) Inventors: Nathan Scolari, Greenville, SC (US); George Reiter, Taylors, SC (US)

(73) Assignee: Zike, LLC, Greenville, SC (US)

( * ) Notice: Subject to any disclaimer, the term of this patent is extended or adjusted under 35 U.S.C. 154(b) by 0 days.

(21) Appl. No.: 13/800,667

(22) Filed: Mar. 13, 2013

(65) Prior Publication Data
US 2014/0265212 A1  Sep. 18, 2014

(51) Int. Cl.
B62M 1/02 (2006.01)
B62M 1/28 (2013.01)
B62M 1/30 (2013.01)
B62M 1/24 (2013.01)
B62M 1/26 (2013.01)

(52) U.S. Cl.
CPC . B62M 1/28 (2013.01); B62M 1/30 (2013.01); B62M 1/24 (2013.01); B62M 1/26 (2013.01)
USPC ............ 280/253; 280/244; 280/247; 280/256

(58) Field of Classification Search
CPC ............ B62M 1/26; B62M 1/24; B62M 1/30; B62M 1/32
USPC ................................. 280/253, 244, 247, 256
See application file for complete search history.

(56) References Cited

U.S. PATENT DOCUMENTS

| 527,396 A * | 10/1894 | Whitaker et al. ............. 280/251 |
| 4,133,550 A | 1/1979 | Brown |
| 4,880,249 A | 11/1989 | Gray et al. |
| 5,310,202 A | 5/1994 | Goodspeed |
| 6,454,671 B1 | 9/2002 | Wickliffe |
| 7,784,808 B2 * | 8/2010 | Fan ................................. 280/221 |
| 7,988,169 B2 * | 8/2011 | Baek et al. .................... 280/221 |
| 2007/0079790 A1 | 4/2007 | Pattakos et al. |
| 2008/0096706 A1 | 4/2008 | Watarai et al. |
| 2008/0264197 A1 | 10/2008 | Shahana |
| 2011/0028252 A1 | 2/2011 | Tzvetkov |
| 2012/0088618 A1 | 4/2012 | Scolari et al. |

FOREIGN PATENT DOCUMENTS

DE   20213280 U1   3/2003
WO    0024630 A1   5/2000

OTHER PUBLICATIONS

International Search Report and Written Opinion of the International Searching Authority for PCT/US2014/026412.

* cited by examiner

Primary Examiner — Joseph M Rocca
Assistant Examiner — Marlon Arce
(74) Attorney, Agent, or Firm — McNair Law Firm, P.A.; Douglas L. Kim; Seann P. Lahey (57) ABSTRACT A lever drive system for a scooter including a crank arm having a first distal end pivotally carried on a frame and operatively associated with a drive sprocket, wherein reciprocating movement of the crank arm causes rotation of the drive sprocket for moving a drive chain operatively associated with a wheel assembly. A footrest is disposed on the crank arm for operating the crank arm. A cam member is pivotally mounted to the frame generally adjacent the crank arm. A cam follower is carried by the crank arm engaging the cam member, wherein movement of the crank arm causes the cam follower to move along a contoured control surface of the cam member for controlling an up and down movement of the crank arm.

19 Claims, 12 Drawing Sheets

0/360 Degree

LEVER DRIVE SYSTEM FOR A SCOOTER

BACKGROUND OF THE INVENTION

1) Field of the Invention

The present invention relates to non-motorized pedal powered scooters, and more particularly, to a lever drive system for a scooter using an arrangement of cams operatively associated with a pair of crank arms for controlling upward and downward movement of the crank arms.

2) Description of Related Art

The prior art replete with various types of non-motorized scooters. One type of scooter involves the use of lever type crank arms on which the user stands. A reciprocating up and down movement of the crank arms turns a sprocket through any series of various connections. The sprocket drives a chain operatively associated with a sprocket on a drive wheel. A problem arises, however, in that the lever type crank arms do not include any mechanisms to control the up and down movement. As such, the lever type crank arms can be hard to depress and get started when first getting on the scooter and they also tend to end a downward stroke with a sudden stop, providing a harsh operating feeling for the user. In some arrangements, the crank arms operate independently and thus a downward movement of one crank arm has no operating effect on helping to move the second crank arm.

Accordingly, it is an object of the present invention to provide a drive system for a pedal operated scooter that incorporates an arrangement of cams to control the upward and downward movement of the crank arms.

It is a further object of the present invention to provide a cam arrangement in which the downward movement of a given crank arm is decelerated as it approached the bottom of a stroke.

It is a further object of the present invention to provide a cam arrangement in which a downward movement of one crank arm facilitates an upward movement of a second crank arm.

SUMMARY OF THE INVENTION

The above objectives are accomplished according to the present invention by providing a lever drive system for a scooter, comprising: a crank arm having a first distal end pivotally carried on a frame and operatively associated with a drive sprocket, wherein reciprocating movement of said crank arm causes rotation of said drive sprocket for moving a drive chain operatively associated with a wheel assembly; a footrest disposed on said crank arm for operating said crank arm; a cam member pivotally mounted to said frame generally adjacent said crank arm; and, a cam follower carried by said crank arm engaging said cam member, wherein movement of said crank arm causes said cam follower to move along a contoured control surface of said cam member for controlling an up and down movement of said crank arm. The system can be further adapted for use on other non-motorized vehicles, such as bicycles and the like.

In a further advantageous embodiment, the contoured control surface includes a first surface area defining a drive section for controlling downward movement of said crank arm, a second surface area defining a lifting section for controlling upward movement of said crank arm, and a third surface area defining a stationary section controlling transitions between upward and downward motion of said crank arm.

In a further advantageous embodiment, said drive section extends further around said contoured control surface of said cam member than said lifting section, and said stationary section is disposed entirely between said lifting section and said drive section.

In a further advantageous embodiment, said lifting section has an aspheric radius of curvature that is generally less in curvature than said drive section so that said cam follower traverses said lifting section when said crank arm moves in an upward motion quicker than when said cam follower is traversing said drive section in a downward motion.

In a further advantageous embodiment, said drive section has an aspheric radius of curvature which increases in curvature from said lifting section towards said stationary section, wherein a deceleration of said crank arm is provided as said cam follower transitions from said drive section to said stationary section of said cam member along the increasing curvature.

In a further advantageous embodiment, said stationary section includes a generally flat surface portion allowing said cam follower to traverse said stationary section without raising or lowering said crank arm as the cam member rotates.

In a further advantageous embodiment, a first crank arm is carried on a first side of said frame, and a second crank arm carried on a second side of said frame; a first cam member operatively associated with a cam follower carried on said first crank arm, and a second cam member operatively associated with a cam follower on said second crank arm.

In a further advantageous embodiment, said first cam member and said second cam member are carried on a spindle extending through said frame so that said first and second cam members are disposed on opposite sides of said frame.

In a further advantageous embodiment, said first cam member is carried on said spindle in a different orientation than said second cam member.

In a further advantageous embodiment, said first cam member is oriented on said spindle approximately 180° of rotation from a common alignment with said second cam member, wherein a downward force on said first crank arm directing said cam follower along said first cam member causes rotation of said second cam member to direct said cam follower of said second crank arm to move in an upward direction to raise said second crank arm as said first crank arm is lowered.

The above objectives are further accomplished according to the present invention in an alternative embodiment by providing a lever drive system for a scooter comprising a crank arm having a first distal end pivotally carried on a frame and operatively associated with a drive sprocket, wherein reciprocating movement of said crank arm causes rotation of said drive sprocket for moving a drive chain operatively associated with a wheel assembly; a footrest disposed on said crank arm for operating said crank arm; a cam member pivotally mounted to said frame generally adjacent said crank arm, wherein said cam member includes an outer cam portion and an inner cam portion; and, an outer cam follower carried by said crank arm engaging said outer cam portion, and a inner cam follower carried by said crank arm engaging said inner cam portion, wherein movement of said crank arm causes said inner and outer cam followers to move along a contoured control surface disposed on said inner and outer cam portions for controlling an up and down movement of said crank arm.

In a further advantageous embodiment, said contoured control surface of said outer cam portion is displaced laterally adjacent from said contoured control surface of said inner cam portion.

In a further advantageous embodiment, said outer cam follower is carried on a first side of said crank arm, and said inner cam follower is carried on a second side of said crank arm opposite said first side, wherein said displacement of said contoured control surface of said outer cam portion is approximately the thickness of said crank arm.

In a further advantageous embodiment, said contoured control surface on said outer cam portion includes a first surface area defining a first drive section for controlling a downward movement of said crank arm, a second surface area defining a lifting section for controlling upward movement of said crank arm, and a third surface area defining a stationary section controlling transitions between upward and downward motion of said crank arm.

In a further advantageous embodiment, said contoured control surface of said inner cam portion includes a first surface area defining a second drive section for controlling downward movement of said crank arm, and a second surface area defining a second lifting section for controlling upward movement of said crank arm.

In a further advantageous embodiment, said outer cam follower disengages said first drive section of said outer cam portion generally as said inner cam follower engages said second drive section of said inner cam portion, wherein an increased drive stroke is provided during the downward movement and rotation of said crank arm.

In a further advantageous embodiment, said inner cam follower disengages said second lifting section of said inner cam portion generally as said outer cam follower engages said first lifting section of said outer cam portion to maintain a controlled lifting stroke of said crank arm as said cam member rotates.

In a further advantageous embodiment, a first crank arm is carried on a first side of said frame, and a second crank arm carried on a second side of said frame; a first cam member is operatively associated with a cam follower carried on said first crank arm, and a second cam member is operatively associated with a cam follower on said second crank arm.

In a further advantageous embodiment, said first cam member and said second cam member are carried on a spindle extending through said frame so that said first and second cam members are disposed on opposite sides of said frame.

In a further advantageous embodiment, said first cam member is oriented on said spindle approximately 180° of rotation from a common alignment with said second cam member, wherein a downward force on said first crank arm directing said inner and outer cam followers along said first cam member causes rotation of said second cam member to direct said inner and outer cam followers of said second crank arm to move in an upward direction to raise said second crank arm as said first crank arm is lowered.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below.

DETAILED DESCRIPTION OF A PREFERRED EMBODIMENT

With reference to the drawings, the invention will now be described in more detail.

Figure 1:
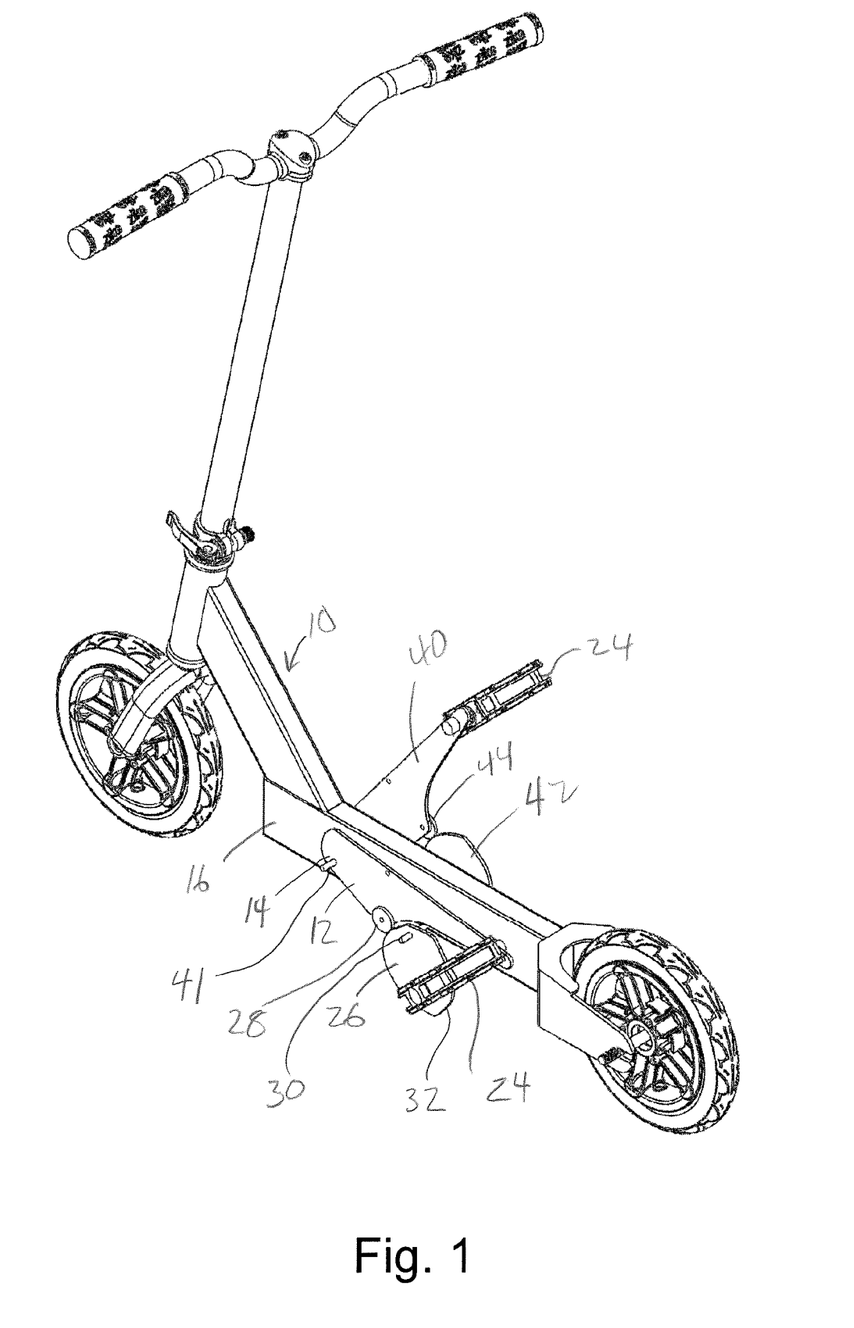
FIG. 1 shows a perspective view of a first embodiment of a scooter with a lever drive system having a cam arrangement according to the present invention.

Referring to FIG. 1, a first embodiment of a scooter 10 is shown having a lever drive system according to the present invention. In the illustrated embodiment, a crank arm 12 is provided having a first distal end 14 pivotally carried on a frame 16. Referring to FIG. 4B, crank arm 12 is operatively associated with a drive sprocket 18 for turning the drive sprocket when a downward force is applied to crank arm 12. Typically, drive sprocket 18 is a one way clutch sprocket assembly that provides for a free-spin arrangement when coasting so the crank arm does not continually have to move up and down as the wheels turn. Accordingly, reciprocating movement of crank arm 12 causes rotation of drive sprocket 18 for moving a drive chain 20 operatively associated with a rear wheel sprocket 21 of wheel assembly 22. As with drive sprocket 18, rear wheel sprocket 21 can be a one way clutch sprocket assembly that provides for a free-spin arrangement when coasting. As shown and detailed herein below, in the preferred arrangement, a crank arm is provided on each side of frame 16 that is operatively associated with at least one of a drive sprocket 18.

A footrest 24 is disposed on crank arm 12 for operating the crank arm. In the illustrated embodiment, footrest 24 is a pivotally mounted common type of pedal. Alternatively, an integrated platform type footrest may be provided that extends along a length of crank arm 12.

With reference to FIGS. 1, 2A-2B and 3A-3B, a cam member 26 is pivotally mounted to frame 16 on a spindle 30 generally adjacent crank arm 12. A cam follower 28 is carried by crank arm 12 and engages cam member 26. Accordingly, an upward or downward movement of crank arm 12 causes cam follower 28 to move along a contoured control surface 32 of cam member 26 for controlling an up and down stroke movement of crank arm 12.

Figure 2A:
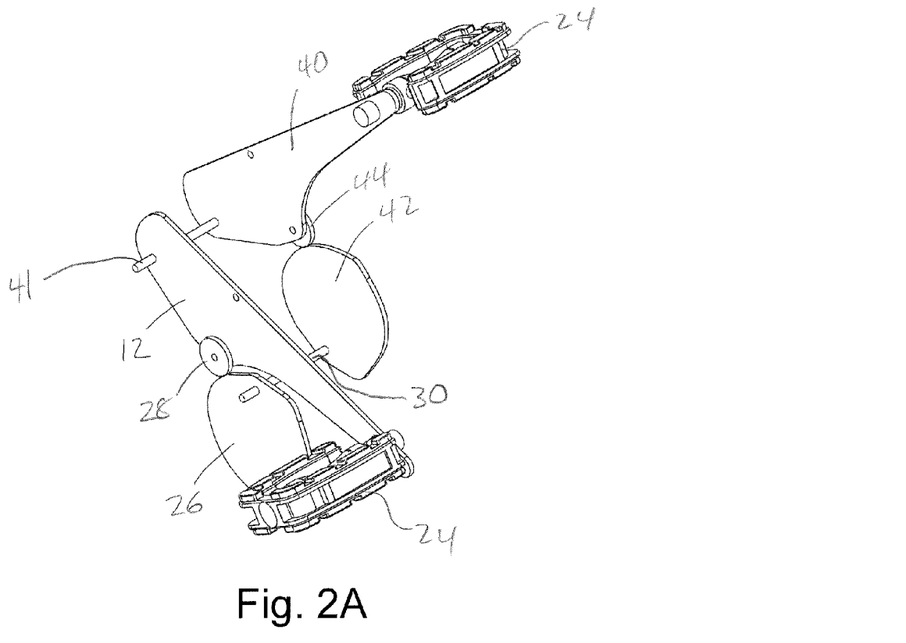
FIG. 2A shows an isolated perspective view of an arrangement of cam members operatively associated with a pair of crank arms according to the present invention, wherein a first crank arm is in a down position.
Figure 2B:
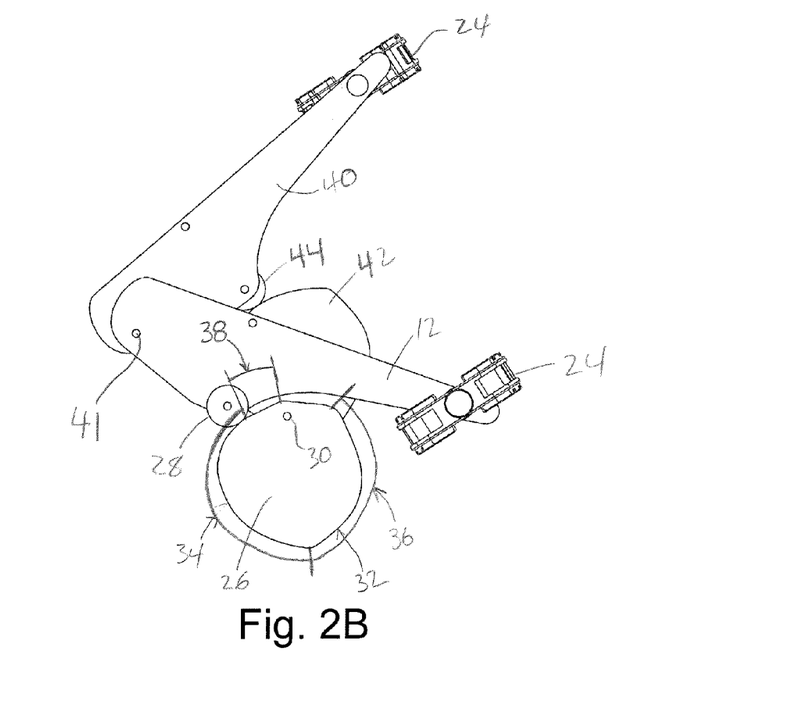
FIG. 2B shows a side view of FIG. 2A.
Figure 3A:
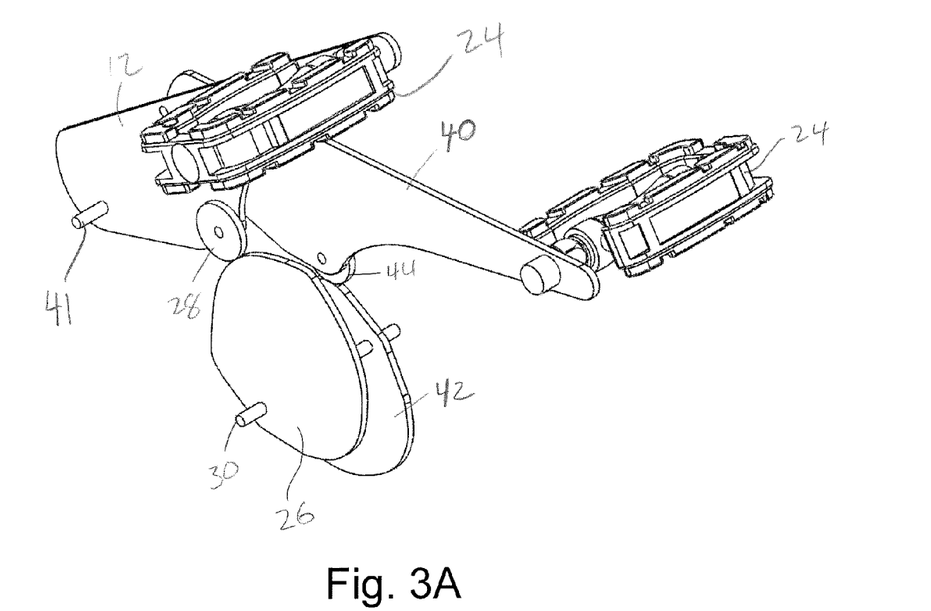
FIG. 3A shows an isolated perspective view of an arrangement of cam members operatively associated with a pair of crank arms according to the present invention, wherein a first crank arm is in an up position.
Figure 3B:
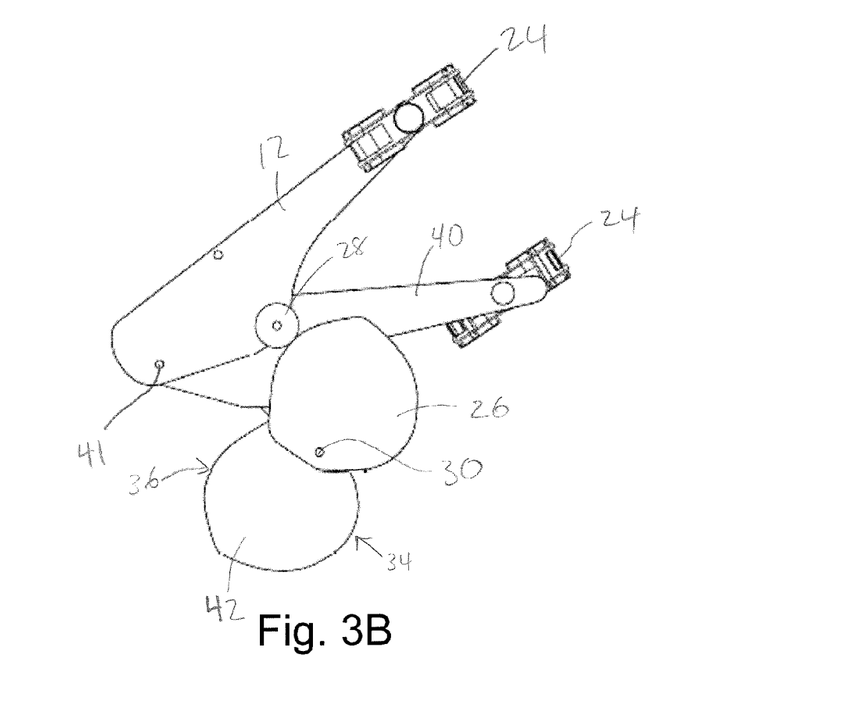
FIG. 3B shows a side view of FIG. 3A.

Referring to FIG. 2B, in the illustrated embodiment, contoured control surface 32 includes a first surface area defining a drive section, designated generally as 34, for controlling downward movement of crank arm 12. Contoured control surface 32 includes a second surface area defining a lifting section, designated generally as 36, for controlling upward movement of crank arm 12. Contoured control surface 32 also includes a third surface area defining a stationary section, designated generally as 38, controlling transitions between upward and downward motion of crank arm 12.

Preferably, drive section 34 extends further around contoured control surface 32 of cam member 26 than lifting section 36 so that cam follower 28 travels a longer distance over drive section 34 and when traversing lifting section 36. Further, stationary section 38 is disposed entirely between lifting section 36 and drive section 34. In operation, from the position shown in FIG. 2B, cam 26 rotates in a counter-clockwise direction such that cam follower 28 moves from drive section 34 into stationary section 38, and then onto lifting section 36 as crank arm 12 reciprocates up and down.

Referring to FIG. 2B, in the illustrated embodiment, lifting section 36 has an aspheric radius of curvature that is generally less in curvature than drive section 34 so that cam follower 28 traverses lifting section 36 more quickly when said crank arm moves in an upward motion than when said cam follower is traversing said drive section in a downward motion. This provides a quicker return stroke for the rider.

Referring to FIG. 2B, in the illustrated embodiment, drive section 34 has an aspheric radius of curvature which increases in curvature from lifting section 36 towards stationary section 38 where it transitions to a generally flat surface area, stationary section 38, of contoured control surface 32. Accordingly, a deceleration of crank arm 12 is provided as cam follower 28 transitions from drive section 34 to stationary section 38 of cam member 26.

Referring to FIG. 2B, in the illustrated embodiment, stationary section 38 includes a generally flat surface portion allowing cam follower 28 to traverse stationary section 38 generally without raising or lowering crank arm 12.

Referring to FIGS. 1, 2A-2B and 3A-3B, in the illustrated embodiment, the lever drive system preferably includes a crank arm and associated cam member on each side of frame 16. Accordingly, a first crank arm 12, as detailed above, is carried on a first side of frame 16, and a second crank arm 40 is carried on a second side of frame 16 opposite the first side. In the illustrated embodiment, a spindle 41 is provided which passes through frame 16 on which first and second crank arms 12 and 40 are pivotally carried generally at a distal end to provide the lever action for turning drive sprocket 18 (FIG. 4B). Second crank arm 40 is identical to first crank arm 12, only adapted to perform on the second side of frame 16. A first cam member 26, as detailed above, is operatively associated with cam follower 28 carried on first crank arm 12, and a second cam member 42 is operatively associated with a cam follower 44 on second crank arm 40. Second cam member 42 is identical in construction to first cam member 26 with the same arrangement of contoured control surface 32 as detailed above for cam member 26.

First cam member 26 and second cam member 42 are carried by and fixed to a common spindle 30 extending through frame 16 so that first and second cam members are disposed on opposite sides of frame 16 and rotate together. Further, first cam member 26 is carried on spindle 30 in a different orientation than second cam member 42. In particular, to facilitate a cooperative movement between first crank arm 12 and second crank arm 40, first cam member 26 is oriented on spindle 30 approximately 180° of rotation from a common alignment with second cam member 42. In this displaced orientation, a downward stroke on first crank arm 12 directing cam follower 28 along drive section 34 of first cam member 26 causes rotation of the cam members via spindle 30. On the second side of frame 16, rotation of second cam member 42 directs cam follower 44 of second crank arm 40 along lifting section 36 to move in an upward direction to raise second crank arm 40 as first crank arm 12 is lowered.

Referring to FIGS. 2A and 2B, in operation, as second crank arm 40 is moved downward, cam follower 44 traverses drive section 34, which causes rotation of second cam member 42 and spindle 30, which in turn causes cam member 26 to rotate and cam follower 28 to extend across stationary section 38 and transition onto lifting section 36 which directs first crank arm 12 upward as second crank arm 40 moves downward. The cycle is then repeated as first crank arm 12 reaches drive section 34 of first cam member 26 and beings a downward motion/stroke that directs cam follower 44 onto stationary section 38 of second cam member 42 and then onto lifting section 36 to move second crank arm 40 upward as second cam member 42 rotates as a result of the drive force applied to first cam member 26. Thus, the upward and downward movement of first and second crank arms 12 and 40 is controlled according to the contoured control surface 32 applied to first and second cam members 26 and 42.

Referring to FIGS. 4A-8H, an alternative embodiment of the lever drive system. In this alternative embodiment, a pair of crank arms 12 and 40 are provide which are largely the same as those detailed above in the embodiment shown in FIGS. 1-3B. In this alternative embodiment, as before, a first crank arm 12 is pivotally carried on a first side of frame 16, and a second crank arm 40 is carried on a second side of frame 16. In the illustrated embodiment, a spindle 41 is provided which passes through frame 16 on which first and second crank arms 12 and 40 are pivotally carried generally at a distal end to provide the lever action for turning drive sprocket 18 (FIG. 4B).

Figure 5A:
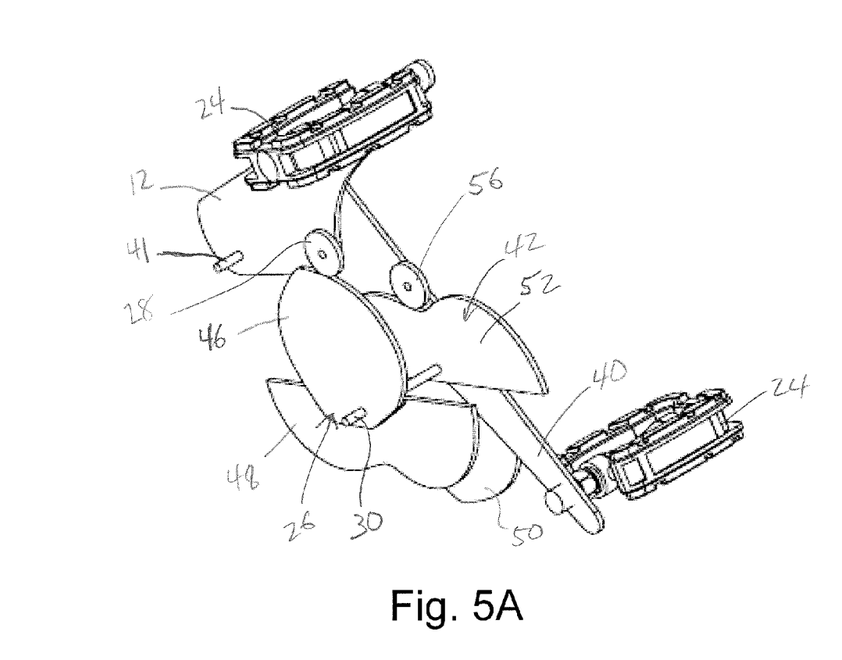
FIG. 5A shows an isolated perspective view of an arrangement of cam members operatively associated with a pair of crank arms according to the present invention, wherein a first crank arm is in an up position.

Referring to FIG. 5A, a footrest 24 is disposed on each of crank arm 12 and 40 for operating the crank arms in the same manner as detailed above.

The alternative embodiment shown in FIGS. 4A-8H include a first cam member 26 operatively associated with a cam follower 28 carried on first crank arm 12, and a second cam member 42 operatively associated with a cam follower 44 on second crank arm 40. The cam members 26 and 42 on each side, however, are different in arrangement. In this alternative embodiment, cam members 26 and 42 each include an outer cam portion and an inner cam portion. Referring to FIGS. 5A-5B, first cam member 26 includes an outer cam portion 46 and an inner cam portion 48, and second cam member 42 includes an outer cam portion 50 and an inner cam portion 52.

Figure 6A:
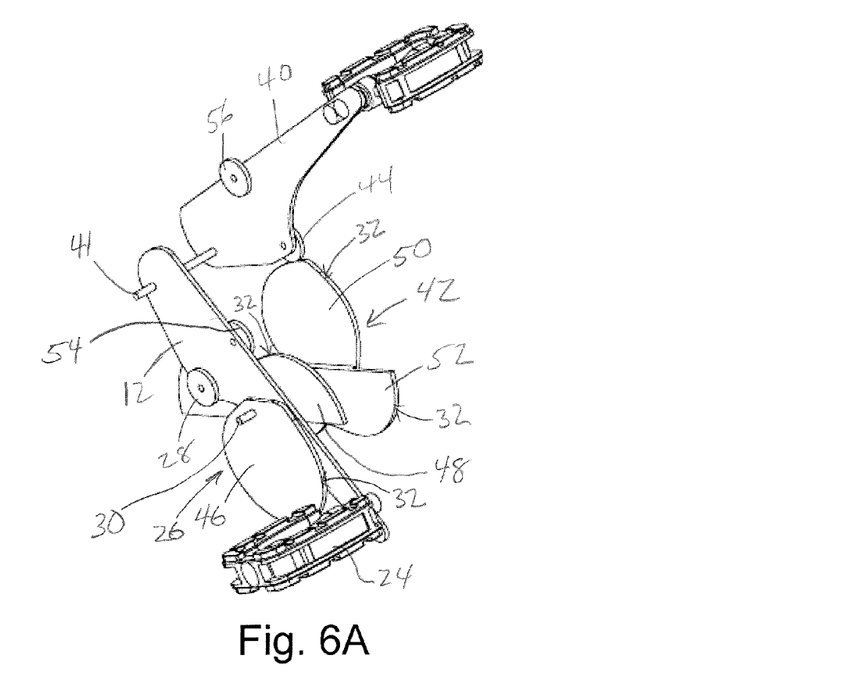
FIG. 6A shows an isolated perspective view of an arrangement of cam members operatively associated with a pair of crank arms according to the present invention, wherein a first crank arm is in a down position.
Figure 6B:
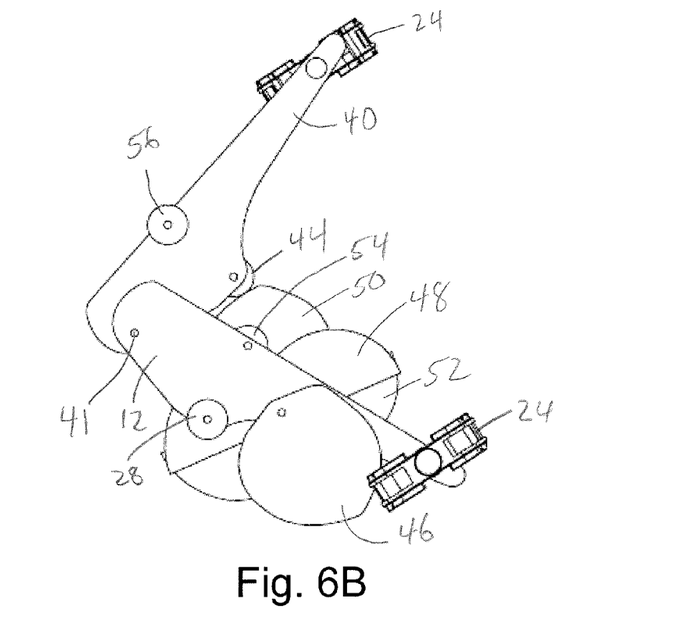
FIG. 6B shows a side view of FIG. 6A.
Figure 7:
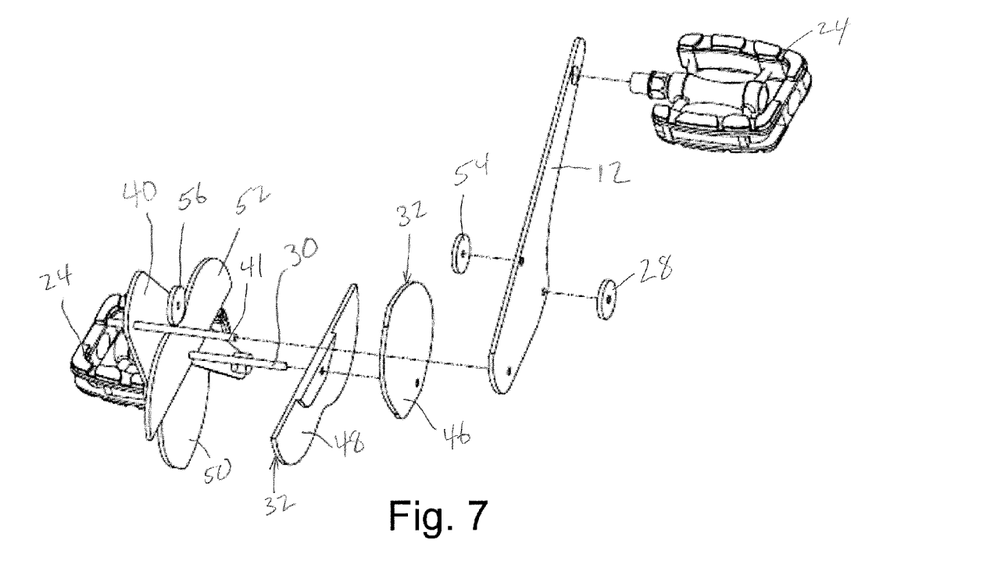
FIG. 7 shows an exploded view of cam member and crank arm according to the present invention; and, FIGS. 8A-8H shows perspective view of the cooperation between the cam members and crank arms at 45° intervals to complete a full 360° rotation according to the present invention.

Referring to FIGS. 6A, 6B and 7, to engaging these additional cam portions, an additional cam follower is added to each of crank arms 12 and 40. Accordingly, first crank arm 12 includes an outer cam follower 28 engaging outer cam portion 46, and a inner cam follower 54 engaging inner cam portion 48. On the opposite side of frame 16, second crank arm 40 includes an outer cam follower 44 engaging outer cam portion 50, and a inner cam follower 56 engaging inner cam portion 52. Accordingly, movement of crank arms 12 and 40 causes said inner and outer cam followers to move along a contoured control surface 32 disposed on said inner and outer cam portions of both first and second cam members 26 and 42 for controlling an up and down movement of crank arms 12 and 40.

Figure 5B:
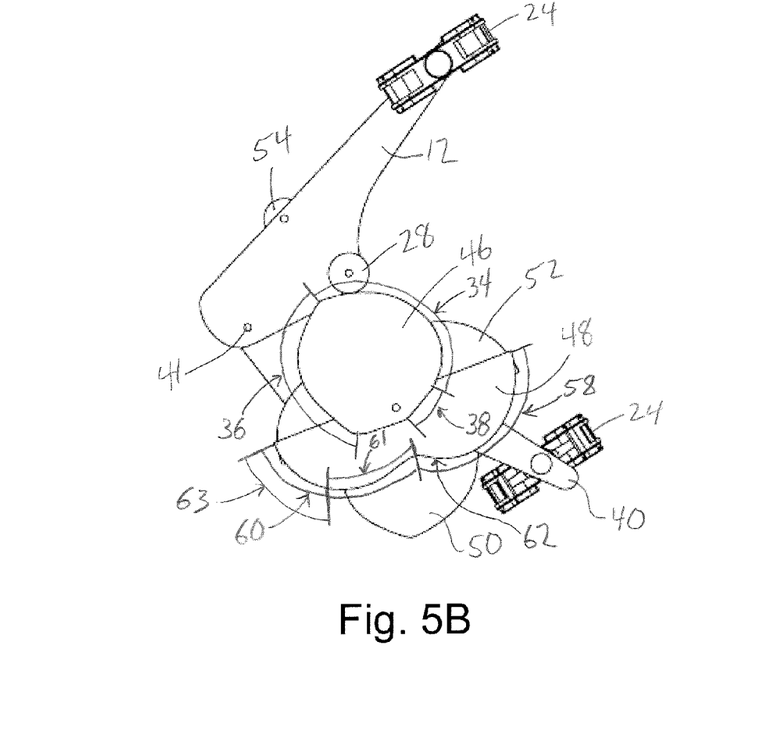
FIG. 5B shows a side view of FIG. 5A.

Outer cam portions 46 and 50 are identical to the cam members 26 and 42, respectively, as described in the embodiment for FIGS. 1-3B. Thus, as detailed above, contoured control surface 32 is disposed on outer cam portions 46 and 50 to control up and down movement of first and second crank arms 12 and 40 as outer cam followers 28 and 44 traverse outer cam portions 46 and 50. Referring to FIG. 5B, contoured control surface 32 of each outer cam portion 46, 50 thus includes a first surface area defining a drive section 34 for controlling downward movement of crank arm 12, a second surface area defining a lifting section 36 for controlling upward movement of crank arm 12, and a third surface area defining a stationary section 38 controlling transitions between upward and downward motion of crank arm 12.

Inner cam portions 48 and 52, are additionally provided in this embodiment and cooperate with outer cam portions 46 and 50, respectively, to further control up and down movement of first and second crank arms 12 and 40. Accordingly, a contoured control surface 32 is provided on inner cam portions 48 and 52 that includes a first surface area defining a second drive section, designated generally as 58, for further controlling downward movement of crank arm 12 and 40 on each cam member 26, 40, and a second surface area defining a second lifting section, designated generally as 60, for further controlling upward movement of crank arm 12 and 40 on each cam member 26, 40.

Referring to FIG. 5B, in a preferred embodiment, second drive section 58 has an aspheric radius of curvature which decreases in curvature moving in a direction from a first distal end toward second lifting section 60. Thus, the curvature of second drive section 58 flattens out along an end portion, designated generally as 62, of second drive section 58. Accordingly, a deceleration of crank arms 12, 40 is provided as cam followers 54, 56 traverse second drive section 58 before transitioning to second lifting section 60. In this alternative embodiment, unlike in the arrangement of FIGS. 1-3B, outer cam followers 28 and 44 no longer traverse stationary section 38 on outer cam portions 46 and 50. The deceleration function provided by stationary section 38 is now performed by inner cam portions 48 and 52 along end portion 62. Excluding end portion 62 of second drive section 58, the rest of second drive section 58 generally follows the same curvature as drive section 34 on outer cam portions 46 and 50 to provide a smooth transition between inner and outer cam portions for the cam followers. As the outer cam followers 28, 44 approach transitioning to stationary section 38, the curvature between drive section 34 and second drive section 58 change such that drive section 34 continues an increase in curvature that transitions into stationary section 38, while second drive section 58 begins a decrease in curvature to flatten out along end portion 62.

Referring to FIG. 5B, second lifting section 60 has an aspheric radius of curvature that first increases in curvature along a first portion, designated generally as 61, moving in a direction from second drive section 58 to a distal end of second lifting section 60, and then decreases in curvature along a second portion, designated generally as 63, before reaching the distal end. The curvature starts out nearly flat along first portion 61 before transitioning into a more pronounced curvature. As inner cam followers 54, 56 traverse second lifting section 60 and approach second portion 63, they are disengaged from inner cam portions 48, 52 as outer cam followers 28, 44 engage lifting section 36 of outer cam portions 46, 50.

Figure 4A:
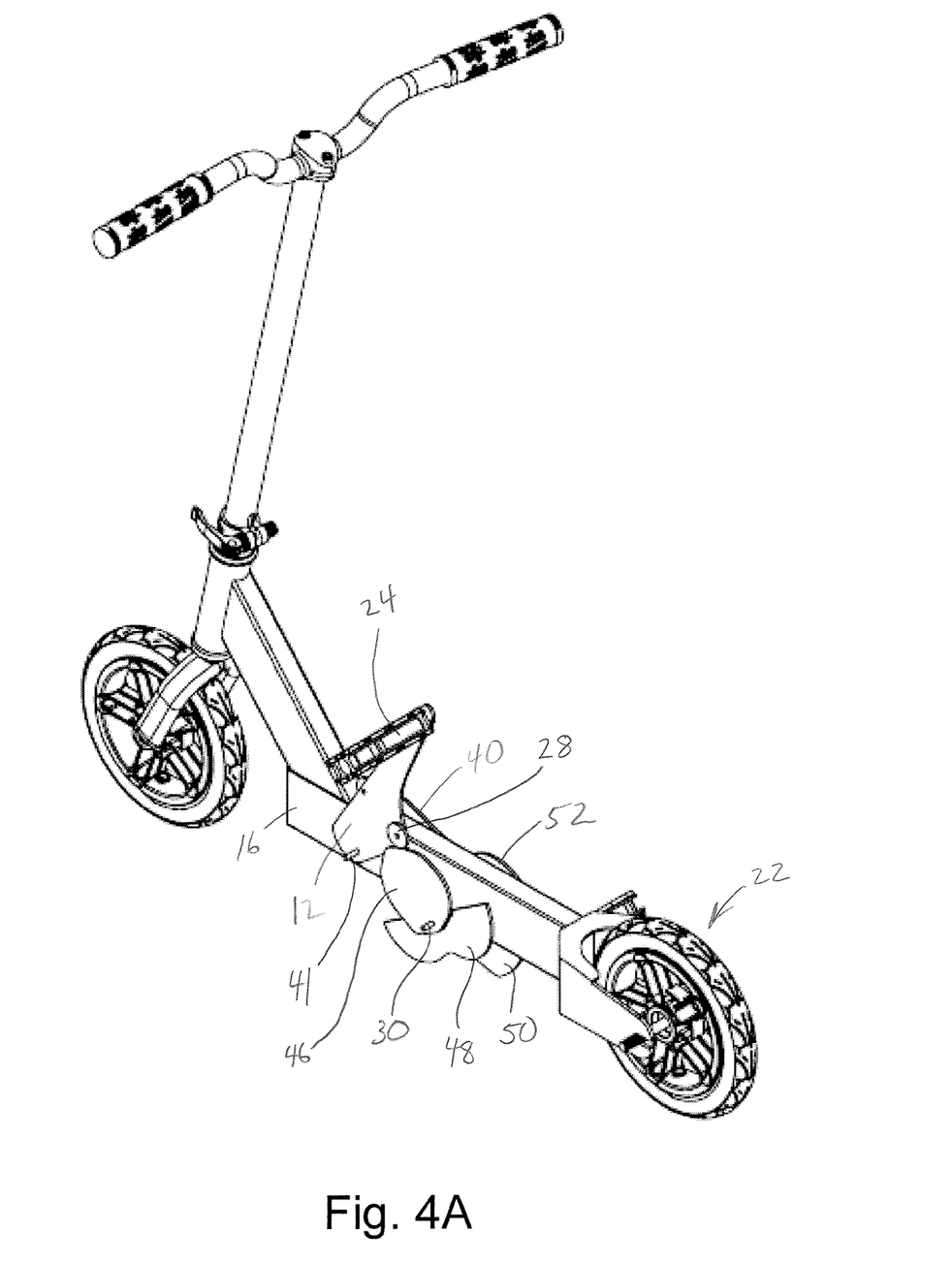
FIG. 4A shows a perspective view of an alternative embodiment of a scooter with a lever drive system having a cam arrangement according to the present invention.
Figure 4B:
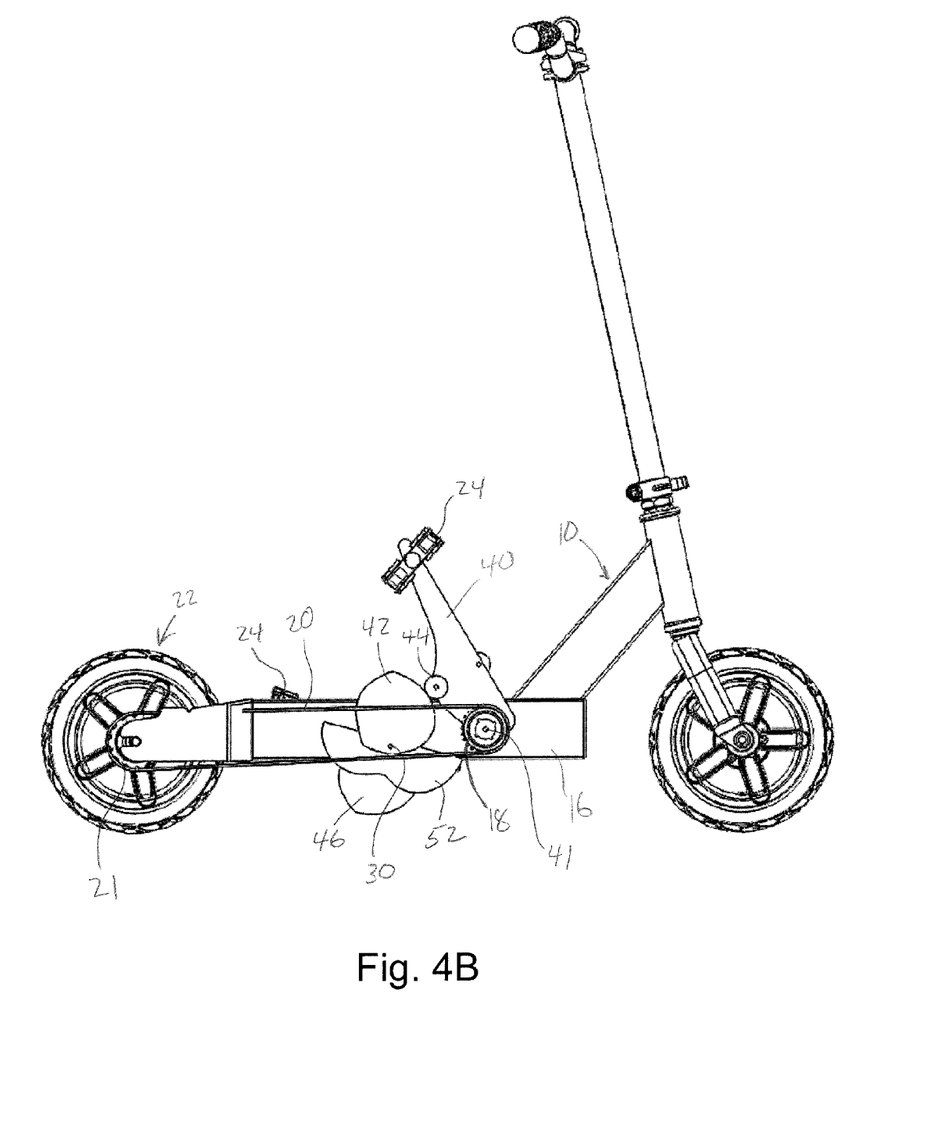
FIG. 4B shows a side view of FIG. 4A.

Referring to FIGS. 4A and 7, first cam member 26 and second cam member 42 are carried on and fixed to a spindle 30 extending through frame 16 so that first and second cam members 26, 42 are disposed on opposite sides of frame 16.

Referring to FIGS. 6A and 7, contoured control surface 32 of outer cam portions 46, 50 are displaced laterally adjacent from contoured control surface 32 of inner cam portion 48, 52. Further, outer cam followers 28, 44 are carried on a first side of crank arms 12, 40, and inner cam followers 54, 56 are carried on a second side of crank arms 12, 40, respectively, opposite the first side, wherein the displacement of contoured control surface 32 of outer cam portions 46, 50 are approximately the thickness of crank arms 12, 40.

Referring to FIGS. 8A-8H, first cam member 26 is oriented on spindle 30 approximately 180° of rotation from a common alignment with second cam member 42. Accordingly, a downward force on first crank arm 12 directing inner and outer cam followers 54, 28 along first cam member 26 causes rotation of the cam members, wherein second cam member 42 directs inner and outer cam followers 56, 44 of second crank arm 40 to move in an upward direction to raise second crank arm 40 as first crank arm 12 is lowered.

Figure 8A:
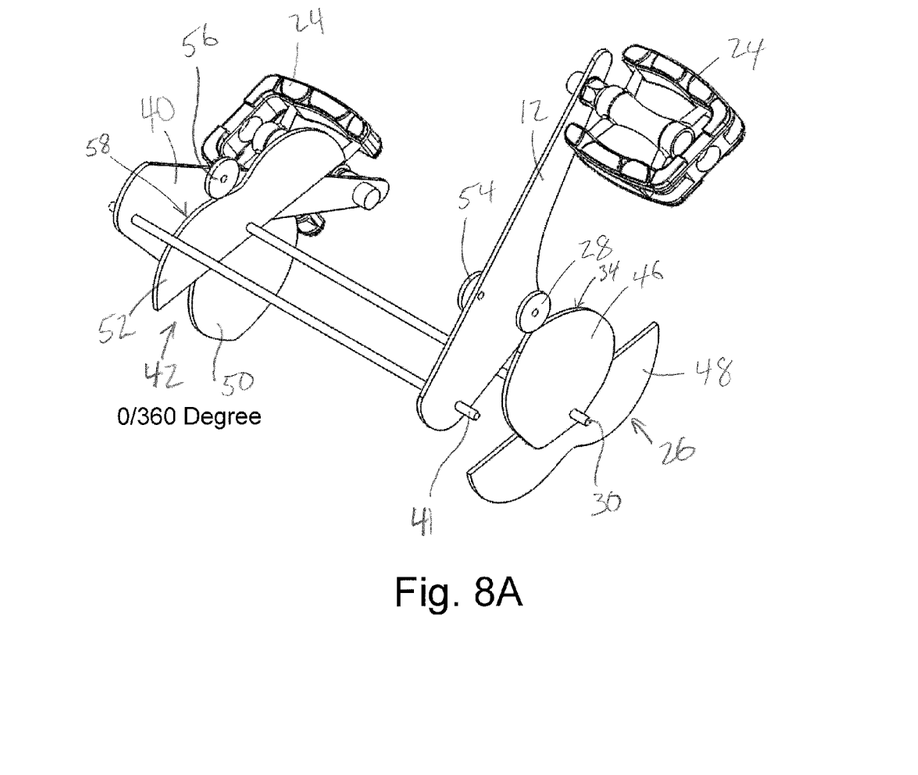

Referring to FIG. 8A, with first crank arm 12 in an up position, outer cam follower 28 is positioned at a beginning of drive section 34 on outer cam portion 46. On the other side of frame 16, second crank arm 40 is in a down position and inner cam follower 56 is positioned on end portion 62 of second drive section 58.

Figure 8B:
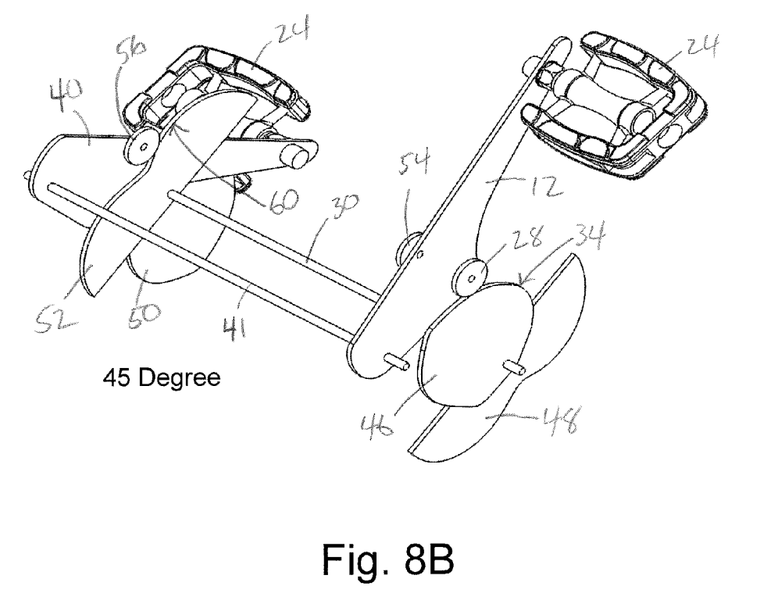

Referring to FIG. 8B, as first crank arm 12 is moved downward, outer cam follower 28 traverses drive section 34 on outer cam portion 46, while inner cam follower 56 on second crank arm 40 traverses second lifting section 60 on inner cam portion 52.

Figure 8C:
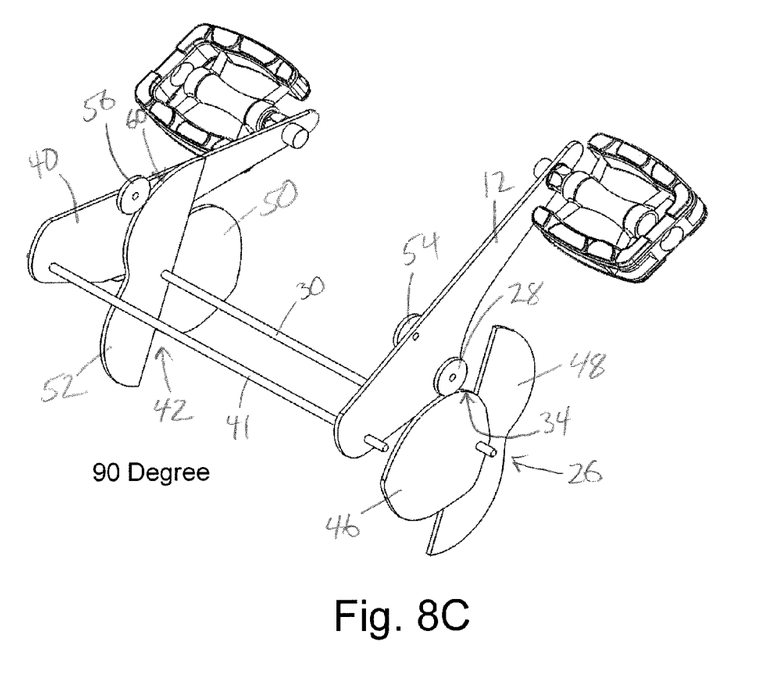

Referring to FIG. 8C, inner cam follower 56 on second crank arm 40 begins a disengagement with inner cam portion 52 as outer cam follower 44 begins engagement with outer cam portion 50.

Figure 8D:
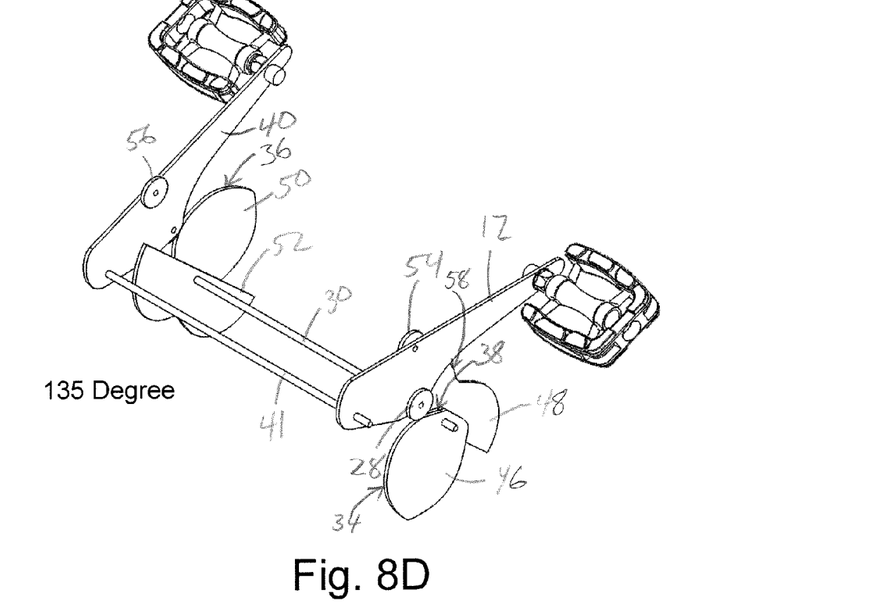

Referring to FIG. 8D, on crank arm 12, outer cam follower 28 begins disengagement with first drive section 34 of outer cam portion 46 prior to stationary section 38 generally as inner cam follower 54 engages said second drive section 58 inner cam portion 48, wherein an increased drive stroke is provided during the downward movement and rotation of the crank arms. Further, inner cam follower 56 is completely disengaged from second lifting section 60 of inner cam portion 52 and outer cam follower 44 is traversing first lifting section 36 on outer cam portion 50 to continue upward movement of second crank arm 40 and maintain a controlled lifting stroke of the crank arm as cam members 26 and 42 rotate.

Figure 8E:
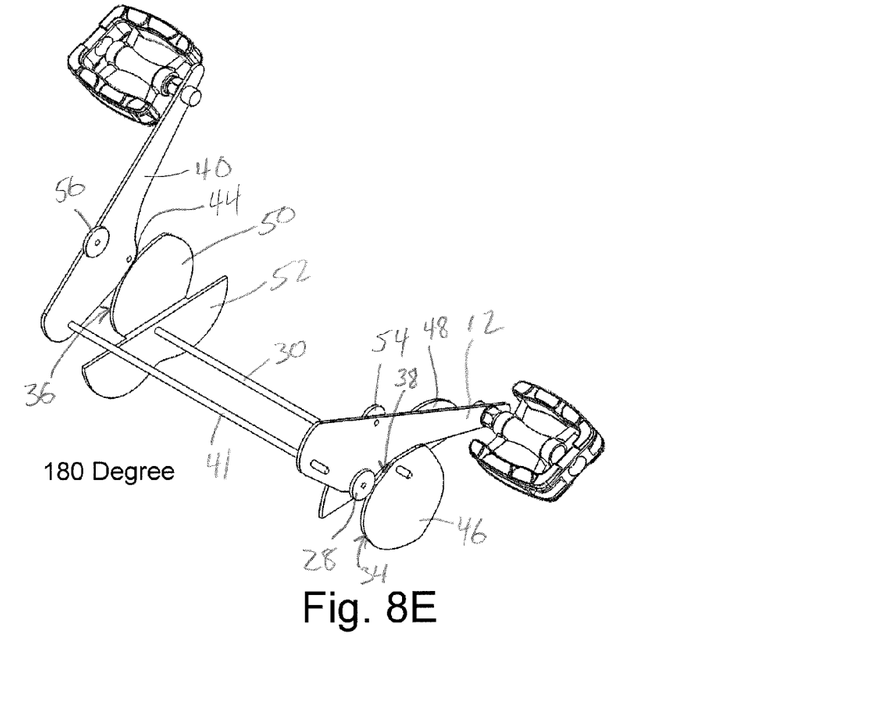

Referring to FIG. 8E, first crank arm 12 begins deceleration before reaching a fully down position as inner cam follower 54 traverses the flattened out end portion 62 of second drive section 58. Second crank arm 40 continues an upward movement as outer cam follower 44 continues traversing lifting section 36 of outer cam portion 50.

Figure 8F:
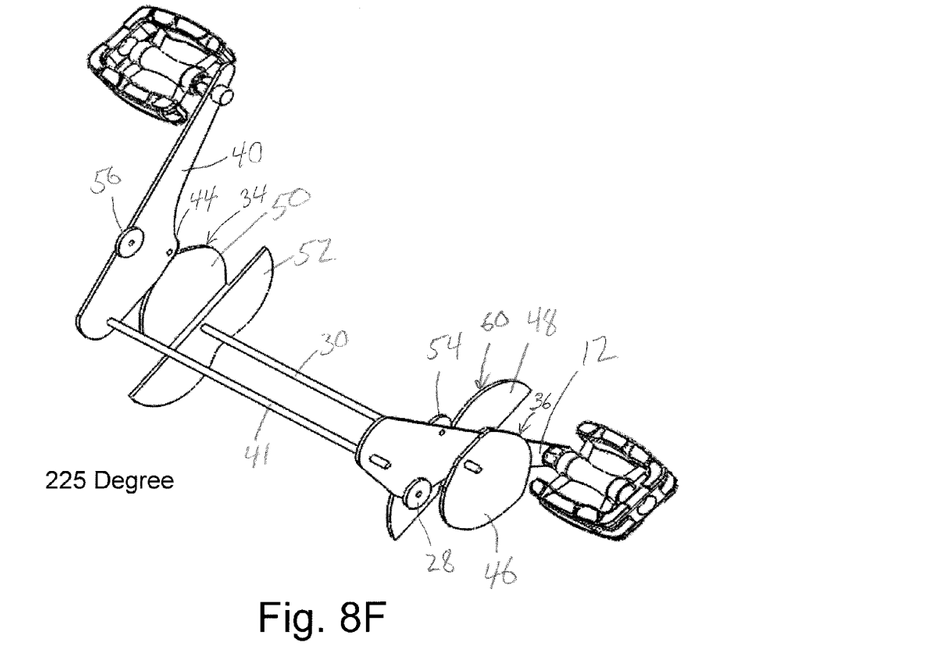

Referring to FIG. 8F, first crank arm 12 reaches a down position and inner cam follower 54 transitions to second lifting section 60 of inner cam portion 48. Second crank arm 40 reaches an up position and outer cam follower 44 transitions to first drive section 34 of outer cam portion 50 to begin a downward movement that will continue rotation of cam members 26 and 42, which will direct first crank arm 12 back up.

Figure 8G:
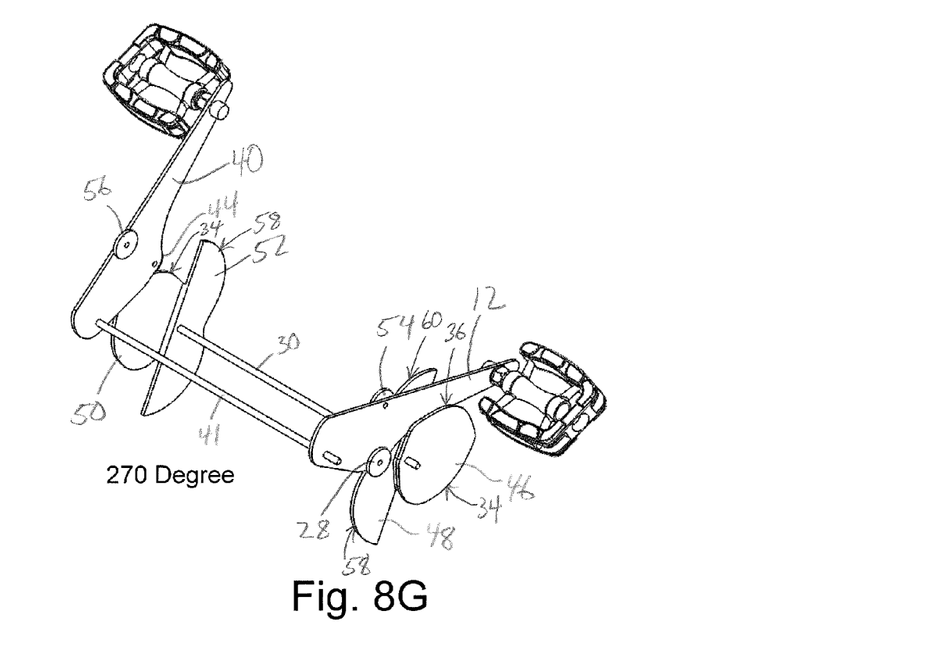

Referring to FIG. 8G, second crank arm 40 moves downward, pushing outer cam follower 44 along drive section 34 of outer cam portion 50 to turn the cam members. On first crank arm 12, inner cam follower 54 traverses second lifting section 60 to raise first crank arm 12.

Figure 8H:
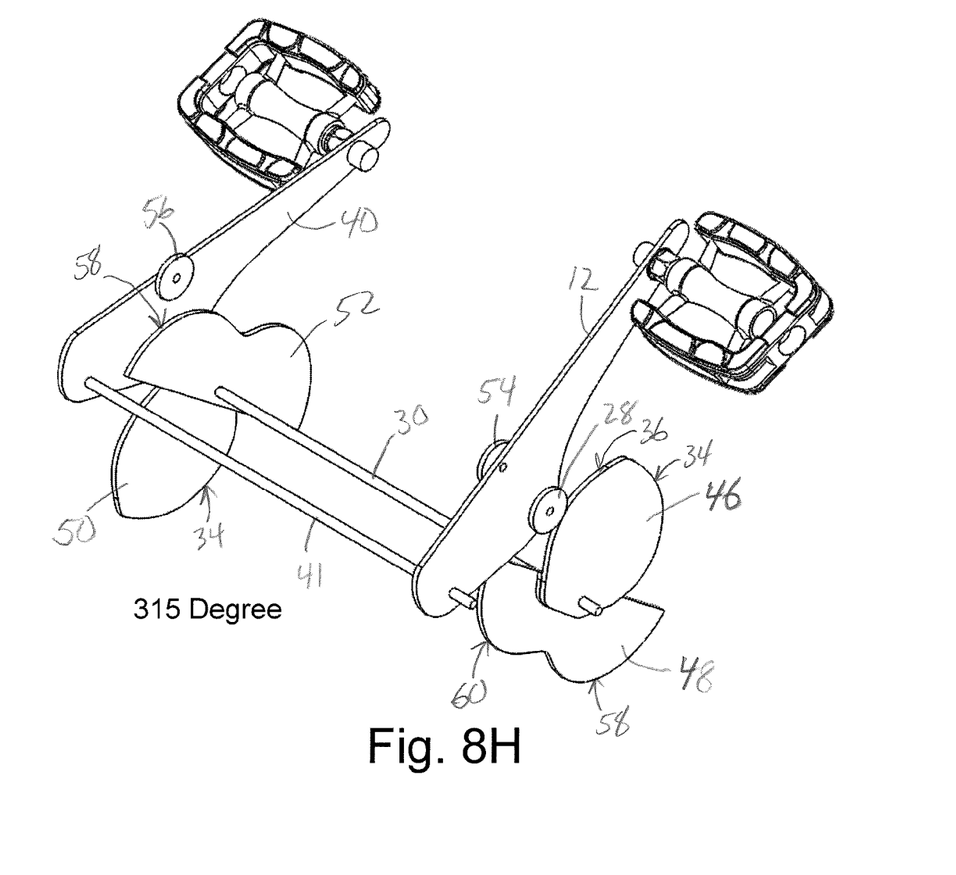

Referring to FIG. 8H, on first crank arm 12, inner cam follower 54 is disengaged from second lifting section 60 and outer cam follower 28 traverses lifting section 36 of outer cam portion 46 as it cycles to a fully up position as in FIG. 8A. Second crank arm 40 continues downward as outer cam follower 44 traverses drive section 34 of outer cam portion 50, which will disengage as inner cam follower 56 engagers second drive section 58 of inner cam portion 52 cycling to a fully down position as in FIG. 8A.

While a preferred embodiment of the invention has been described using specific terms, such description is for illustrative purposes only, and it is to be understood that changes and variations may be made without departing from the spirit or scope of the following claims.

What is claimed is:

1. A lever drive system for a scooter, comprising:
a crank arm having a first distal end pivotally carried on a frame and operatively associated with a drive sprocket, wherein reciprocating movement of said crank arm causes rotation of said drive sprocket for moving a drive chain operatively associated with a wheel assembly;
a footrest disposed on said crank arm for operating said crank arm;
a cam member pivotally mounted to said frame generally adjacent said crank arm;
a cam follower carried by said crank arm engaging said cam member, wherein movement of said crank arm causes said cam follower to move along a contoured control surface of said cam member for controlling an up and down movement of said crank arm; and,
wherein said contoured control surface includes a first surface area defining a drive section for controlling downward movement of said crank arm, a second surface area defining a lifting section for controlling upward movement of said crank arm, and a third surface area defining a stationary section controlling transitions between upward and downward motion of said crank arm.

2. The drive system of claim 1 wherein said drive section extends further around said contoured control surface of said cam member than said lifting section, and said stationary section is disposed entirely between said lifting section and said drive section.

3. The drive system of claim 1 wherein said lifting section has an aspheric radius of curvature that is generally less in curvature than said drive section so that said cam follower traverses said lifting section when said crank arm moves in an upward motion quicker than when said cam follower is traversing said drive section in a downward motion.

4. The drive system of claim 1 wherein said drive section has an aspheric radius of curvature which increases in curvature from said lifting section towards said stationary section, wherein a deceleration of said crank arm is provided as said cam follower transitions from said drive section to said stationary section of said cam member along the increasing curvature.

5. The drive system of claim 1 wherein said stationary section includes a generally flat surface portion allowing said cam follower to traverse said stationary section without raising or lowering said crank arm as said cam member rotates.

6. The drive system of claim 1 including a first crank arm carried on a first side of said frame, and a second crank arm carried on a second side of said frame; a first cam member operatively associated with a cam follower carried on said first crank arm, and a second cam member operatively associated with a cam follower on said second crank arm.

7. The drive system of claim 6 wherein said first cam member and said second cam member are carried on a spindle extending through said frame so that said first and second cam members are disposed on opposite sides of said frame.

8. The drive system of claim 7 wherein said first cam member is carried on said spindle in a different orientation than said second cam member.

9. The drive system of claim 8 wherein said first cam member is oriented on said spindle approximately 180° of rotation from a common alignment with said second cam member, wherein a downward force on said first crank arm directing said cam follower along said first cam member causes rotation of said second cam member to direct said cam follower of said second crank arm to move in an upward direction to raise said second crank arm as said first crank arm is lowered.

10. A lever drive system for a scooter, comprising:
a crank arm having a first distal end pivotally carried on a frame and operatively associated with a drive sprocket, wherein reciprocating movement of said crank arm causes rotation of said drive sprocket for moving a drive chain operatively associated with a wheel assembly;
a footrest disposed on said crank arm for operating said crank arm;
a cam member pivotally mounted to said frame generally adjacent said crank arm, wherein said cam member includes an outer cam portion and an inner cam portion; and,
an outer cam follower carried by said crank arm engaging said outer cam portion, and a inner cam follower carried by said crank arm engaging said inner cam portion, wherein movement of said crank arm causes said inner and outer cam followers to move along a contoured control surface disposed on said inner and outer cam portions for controlling an up and down movement of said crank arm.

11. The drive system of claim 10 wherein said contoured control surface of said outer cam portion is displaced laterally adjacent from said contoured control surface of said inner cam portion.

12. The drive system of claim 11 wherein said outer cam follower is carried on a first side of said crank arm, and said inner cam follower is carried on a second side of said crank arm opposite said first side, wherein said displacement of said contoured control surface of said outer cam portion is approximately the thickness of said crank arm.

13. The drive system of claim 10 wherein said contoured control surface on said outer cam portion includes a first surface area defining a first drive section for controlling a downward movement of said crank arm, a second surface area defining a lifting section for controlling upward movement of said crank arm, and a third surface area defining a stationary section controlling transitions between upward and downward motion of said crank arm.

14. The drive system of claim 13 wherein said contoured control surface of said inner cam portion includes a first surface area defining a second drive section for controlling downward movement of said crank arm, and a second surface area defining a second lifting section for controlling upward movement of said crank arm.

15. The drive system of claim 14 wherein said outer cam follower disengages said first drive section of said outer cam portion generally as said inner cam follower engages said second drive section of said inner cam portion, wherein an increased drive stroke is provided during the downward movement and rotation of said crank arm.

16. The drive system of claim 14 wherein said inner cam follower disengages said second lifting section of said inner cam portion generally as said outer cam follower engages said first lifting section of said outer cam portion to maintain a controlled lifting stroke of said crank arm as said cam member rotates.

17. The drive system of claim 10 including a first crank arm carried on a first side of said frame, and a second crank arm carried on a second side of said frame; a first cam member operatively associated with a cam follower carried on said first crank arm, and a second cam member operatively associated with a cam follower on said second crank arm.

18. The drive system of claim 17 wherein said first cam member and said second cam member are carried on a spindle extending through said frame so that said first and second cam members are disposed on opposite sides of said frame.

19. The drive system of claim 18 wherein said first cam member is oriented on said spindle approximately 180° of rotation from a common alignment with said second cam member, wherein a downward force on said first crank arm directing said inner and outer cam followers along said first cam member causes rotation of said second cam member to direct said inner and outer cam followers of said second crank arm to move in an upward direction to raise said second crank arm as said first crank arm is lowered.

* * * * *